United States Patent
Nagaki et al.

(10) Patent No.: US 8,767,802 B2
(45) Date of Patent: Jul. 1, 2014

(54) TRANSMISSION DEVICE AND TRANSMISSION METHOD

(75) Inventors: Yuichi Nagaki, Kawasaki (JP);
 Masashige Kawarai, Kawasaki (JP);
 Koichi Sugama, Kawasaki (JP);
 Tomohiro Ueno, Kawasaki (JP);
 Takashi Kaiga, Kawasaki (JP); Yukio Katayanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 13/424,931

(22) Filed: Mar. 20, 2012

(65) Prior Publication Data

US 2012/0250739 A1 Oct. 4, 2012

(30) Foreign Application Priority Data

Apr. 1, 2011 (JP) .................................. 2011-082227

(51) Int. Cl.
 *H04B 1/38* (2006.01)
 *H04L 5/16* (2006.01)
(52) U.S. Cl.
 USPC ............................................. 375/219; 455/73
(58) Field of Classification Search
 USPC .......................................................... 375/219
 See application file for complete search history.

(56) References Cited

U.S. PATENT DOCUMENTS

2009/0204843 A1* 8/2009 Celinski et al. ............... 713/400

FOREIGN PATENT DOCUMENTS

JP 10-285081 10/1998

* cited by examiner

*Primary Examiner* — Erin File
(74) *Attorney, Agent, or Firm* — Fujitsu Patent Center

(57) ABSTRACT

A transmission device includes a receiver receiving a signal transmission frame from a network, where a client signal is mapped to the signal transmission frame; a separator separating the client signal from the signal transmission frame; a phase synchronizer generating a clock based on a frequency adjustment information set of the client information included in the signal transmission frame; a transmitter transmitting the client signal to a client transmission path by using the clock generated by the phase synchronizer; a memory storing the frequency adjustment information set included in the signal transmission frame in response to receiving the signal transmission frame from the network by the receiver; and a switch controller causing the phase synchronizer to generate a clock based on the frequency adjustment information set stored in the memory in response to not receiving the signal transmission frame from the network by the receiver.

10 Claims, 18 Drawing Sheets

FIG.9

TRANSMISSION DEVICE AND TRANSMISSION METHOD

CROSS-REFERENCE TO RELATED APPLICATIONS

This application is based upon and claims the benefit of priority of Japanese Patent Application No. 2011-082227, filed Apr. 1, 2011, the entire contents of which are incorporated herein by reference.

FIELD

The embodiment discussed herein is related to a transmission device and a transmission method.

BACKGROUND

Recently, based on a WDM (wavelength Division Multiplexing scheme) which may correspond to a rapid increase of the Internet traffic, an OTN (Optical Transport Network) has been recommended in an ITU-T (International Telecommunication Unit Telecommunication standardization sector) as a so-called transparent platform where an upper layer may not have to recognize a lower layer when a client signal is transmitted from end to end not only in a synchronous network such as an SDH (Synchronous Digital Hierarchy), a SONET (Synchronous Optical NETwork) and the like but also in an asynchronous network such as an IP (Internet Protocol) or the Ethernet based network and the like. The interface and the frame format of the OTN are standardized in recommendation G. 709 of the ITU-T, and have been rapidly introduced in various commercial systems.

FIG. 1 schematically illustrates an example configuration of a SONET transmission system including transmission devices. As illustrated in FIG. 1, in the SONET transmission system, the transmission devices 1A, 1B, 1C, and 1D are connected to each other forming a ring network having a redundant configuration including a working line (Work) (i.e., a currently working line) and a backup line (Protection) described in a solid line and a dotted line, respectively. In the working line (Work) and the backup line (Protection), data are transmitted in the clockwise and counterclockwise directions, respectively. Further, the transmission devices 1B, 1C, and 1D operate in synchronization with a master clock of the transmission device 1A.

FIG. 2 illustrates an example configuration of transmission devices in the SONET transmission system. In the configuration of FIG. 2, a signal which is input from an interface on the client side is terminated by a SONET frame synchronizer 2, and then the clock of the signal is replaced by a system clock from a clock generator 4 in a clock transfer stuff generator 3. Then, the signal is mapped to a SONET frame by a SONET frame generator 5 and is output to a network via a network-side interface.

In the same manner, an input signal from the interface on the network side is terminated by a SONET frame synchronizer 6, and then the clock of the signal is replaced by the system clock from the clock generator 4 in a clock transfer stuff generator 7. Then, the signal is mapped to a client frame by a client frame generator 8 and is output to a client transmission path via a client-side interface.

The network-side interface has a redundancy configuration including the working line (Work) and the backup line (Protection), such that when a failure occurs in the working line (Work), the data transmission line is switched from the working line (Work) to the backup line (Protection) so as to maintain the transmission of the signal (data).

The operation of switching the data transmission line in the redundancy configuration (redundant switching operation) of the SONET transmission system is described. Namely, the operations when the working line in the SONET transmission system of FIG. 2 is cut and the system switches to the backup line are described with reference to a time chart of FIG. 3.

In FIGS. 2 and 3, the symbol (A) denotes a state of the working line on the network side. The symbol (B) denotes an alarm detection result of the working line on the network side. The symbol (C) denotes a selection signal selecting either the working line or the backup line on the network side. The symbol (D) denotes a state of the selected line. The symbol (E) denotes a switching signal of an AIS (Alarm Indication Signal) reporting an occurrence of a failure (an error) to an upper layer. The symbol (F) denotes an output signal of an interface on a client side.

In the time chart of FIG. 3, at time T1, a failure of the line cut or the like occurs in the working line. Then, at time T2, the SONET frame synchronizer 6 on the network side detects an alarm indicating the line cut (a line cut alarm). Further, at time T3, the system is switched from the working line to the backup line in response to the line cut alarm.

The time required for the redundant switching operation is described below. The time for detecting the line cut alarm (alarm detection time, i.e., between T1 and T2) is approximately 1 ms or less. The time for controlling to switch the line (switch control time, between T2 and T3) is approximately 40 ms or less. Therefore, it is realized that the time required for the redundant switching operation is approximately 50 ms or less which may meet a requirement in the switching time for the network system in the above redundant switching operation.

In the SONET transmission system, a synchronization clock is used in the entire network, so that the synchronization clock is used for signal processings in the signal processors in the devices of the system. On the other hand, the OTN transmission system is applied to an upper layer of the SONET transmission system and is similar to the transmission path of the WDM system. Therefore, it may be necessary to transparently transmit a signal from a client interface (as the transparent platform).

Further, the client interface may have to serve as a SONET/SDH interface and may be necessary to transmit client signals having various transmission rates due to various platforms such as the Ethernet (registered trademark), a fibre channel and the like. Therefore, the client signal and the network signal are asynchronously processed. As a result, when the client signal is transmitted as the network signal, the frequency component of the signal is transmitted as information, so that the receiver side reproduces the client interface signal based on the received frequency component.

FIG. 4 illustrates an example network configuration of the OTN transmission system. As illustrated in FIG. 4, transmission devices 1A, 1B, 1C, and 1D are connected to each other forming a ring network having a redundant configuration including a working line (Work) (i.e., a currently working (using) line) and a backup line (Protection) described in a solid line and a dotted line, respectively. In the working line (Work) and the backup line (Protection), data are transmitted in the clockwise and counterclockwise directions, respectively. Further, the transmission devices 1A, 1B, 1C, and 1D operate asynchronously.

FIG. 5 illustrates an example configuration of the OTN transmission system. As illustrated in FIG. 5, a client signal from a client transmission path is converted into an electric signal by an O/E (Optical/Electronic) converter 21, and the client clock is extracted by a client interface 22. Then, the client signal is transmitted to an ODU frame generation stuff generator 23. The ODU frame generation stuff generator 23 maps the client signal to an ODUk frame. In this case, JC bytes which are stuff information as frequency adjustment information of the client signal are added to an overhead of the ODUk frame, and stuff bytes for absorbing the fluctuation in a time domain of the client signal are inserted into a payload area or an overhead area of the ODUk frame.

The ODUk frame output from the ODU frame generation stuff generator 23 is mapped to an internal frame by an internal frame generation stuff generator 24. The internal frame is transmitted through a cross connector and a multiplex separator (which are not shown) and terminated by an internal frame synchronization stuff terminator 25 so as to be the ODUk frame. A clock generator 26 generates the system clock and supplies the system clock to the ODU frame generation stuff generator 23, the internal frame generation stuff generator 24, the internal frame synchronization stuff terminator 25 and the like.

Further, the overhead and FEC (Forward Error Correction) are added to the ODUk frame by OTU frame generators 27A and 28B for the working line and the backup line, respectively, so as to become OTUk frames. The OTUk frames are converted into optical signals by E/O (Electronic/Optical) converters 28A and 28B, and transmitted to an OTN network.

On the other hand, the OTU signal from the working line of the OTN network is converted into an electronic signal by an O/E (Optical/Electronic) converter 31A and terminated by an OTU frame synchronizer 32A so as to become an ODUk frame and be supplied to a selector (SEL) 35. A clock generator 33A generates the clock extracted from the OTU signal and in synchronization with the network clock, and supplies the generated clock to the OTU frame synchronizer 32A, an internal frame generation stuff generator 36 described below, and the like. Similarly, the OTU signal from the backup line is converted into an electronic signal by an O/E (Optical/Electronic) converter 31B and terminated by an OTU frame synchronizer 32B so as to become an ODUk frame and be supplied to the selector (SEL) 35.

The ODUk frame selected by the selector 35 is mapped to the internal frame by an internal frame generation stuff generator 36. In this case, stuff to absorb a time-domain fluctuation of the OTUk frame in the network is generated and inserted into the internal frame. The internal frame is transmitted through a cross connector and a multiplex separator (which are not shown) and terminated by an internal frame synchronization stuff terminator 37 so as to be the ODUk frame.

The ODUk frame is supplied to an ODU frame synchronization stuff terminator 38, by which data, a clock, and a write enable signal are extracted, so that the extracted data, clock and the write enable signals are written into a clock transfer memory 39. Further, the system clock generated by the clock generator 26 is supplied to the internal frame generation stuff generator 36, the internal frame synchronization stuff terminator 37, the ODU frame synchronization stuff terminator 38 and the clock transfer memory 39.

The ODU frame synchronization stuff terminator 38 specifies the insert position of a stuff byte based on stuff information (JC byte) extracted from the overhead of the ODUk frame, prevents the writing in the overhead area and the stuff byte, and generates a write enable signal instructing (causing) the writing in a data part of the payload area. Therefore, the write enable signal output from the ODU frame synchronization stuff terminator 38 is based on the transmission rate (i.e., the stuff information) of the client signal in the transmission device on the transmission side.

Further, the write enable signal output from the ODU frame synchronization stuff terminator 38 is supplied to a PLL (Phase Lock Loop) 40. As the read clock, the PLL 40 generates a clock in synchronization with the write enable signal and by smoothing the client signal. The PLL 40 supplies the generated read clock to the clock transfer memory 39 and a client transmission interface 41.

Based on the read clock, the data of the client signal are read from the clock transfer memory 39 and are output as the client signal from the client transmission interface 41. The client signal is transmitted through a selector (SEL) 42 and converted into an optical signal by an E/O (Electronic/Optical) converter 43 to be transmitted to the client transmission path.

The alarm signals indicating the line cut or the like from the O/E converter 31A and detected by the OTU frame synchronizer 32A for the working line are transmitted to a switch controller (SW CONT) 45 via an OR circuit 34A. Similarly, the alarm signals indicating the line cut or the like from the O/E converter 31B and detected by the OTU frame synchronizer 32B for the backup line are transmitted to the switch controller 45 via an OR circuit 34B. Under the control by the switch controller 45, the selector 42 selects either the client signal output from the client transmission interface 41 or an AIS (Alarm Indication Signal) generated by an AIS generator 44, and supplies the selected signal to the E/O converter 43.

The redundant switching operation of the OTN transmission system is described. Namely, the operations when the working line in the OTN transmission system of FIG. 5 is cut and the switching to the backup line are described with reference to a time chart of FIG. 6. In FIGS. 5 and 6, the symbol (A) denotes a state of the working line on the network side. The symbol (B) denotes an alarm detection result of the working line on the network side. The symbol (C) denotes a first control signal output from the switch controller 45 to select either the working line or the backup line on the network side. The symbol (D) denotes a state of the selected line. The symbol (E) denotes a second control signal output from the switch controller 45 so as to transmit (report) the AIS reporting an occurrence of a failure (an error) to the upper layer. The symbol (F) denotes an output signal of the interface on the client side. The symbol (G) denotes the operations of the PLL 40.

In the time chart of FIG. 6, at time T11, a failure of the line cut or the like occurs in the working line on the network side. Then, at time T12, the OTU frame synchronizer 32A on the network side detects the alarm indicating the line cut (a line cut alarm). Further, at time T13, in this case, the switch controller 45 switches from the working line to the backup line based on the line cut alarm. At time T14, a clock extraction of the PLL 40 (pulling in the clock to the PLL 40) is completed.

The time required for the redundant switching operation is described below. The time for detecting the line cut alarm (alarm detection time, i.e., between T11 and T12) is approximately 1 ms or less. The time for the control to switch lines (switch control time, between T12 and T13) is approximately 40 ms or less. On the other hand, the maximum clock extraction time by the PLL 40 (between T13 and T14) is approximately 3 s. The reason why the clock extraction time by the PLL 40 (between T13 and T14) requires such a longer time is that the PLL 40 loses synchronization in the switch control time between (T13 and T14).

On the other hand, there is a proposed technique (e.g., Japanese Laid-open Patent Publication No. 10-285081) to prevent the clock of the PLL in the demodulator being out-of-synchronization. To that end, in normal state, a monitor pilot signal "a" having a frequency of the intermediate value between the highest and the lowest frequencies among the input signals b1 through N is transmitted. When a specific working line "c" is degraded, a switching signal is transmitted from the demodulator to a receiving terminal switch controller. The receiving terminal switch controller transmits a transmission terminal switching signal to a transmission terminal switch controller.

The transmission terminal switch controller synchronizes the frequency of the pilot signal "a" with the frequency of the signal frequency of the degraded working line "c", and then, performs a wireless transmission by transmitting the input signal of the working line to the backup line as well. As a result, in the demodulator, when the signal is changed from the pilot signal "a" to an input signal "b1", since the frequency of the pilot signal "a" is the same as that of the input signal "b1", the clock synchronization of the PLL in the demodulator may be maintained, and the switching operation of a non-interruption switcher may be surely performed based on a signal from the receiving terminal switch controller.

The OTN transmission system may be considered as an upper layer of the SONET transmission system. Therefore, the redundant switching operation of the OTN transmission system may be required to be completed within 50 ms, similar to that of the SONET transmission system. To that end, it may be necessary to reduce the time for extracting the clock by the PLL (i.e., the time period to extract (pull in) the clock by the PLL) (hereinafter may be referred to as "pull-in time" or "(clock) extraction time"). Generally, in the characteristics of the PLL, there is a trade-off relationship between the pull-in time (extraction time) and the output jitter. Namely, the output jitter is likely to increase as the pull-in time is decreased.

In the OTN transmission system, various types of client signals are multiplexed and separated. Therefore, when the signals are multiplexed and separated, extra signals are inserted and removed based on the frequency components of the client signal and the OTN transmission system (i.e., a stuff processing is performed). Therefore, the PLL may be required to have jitter suppression characteristics and, as a result, the pull-in time of the PLL may be longer. Due to the requirement of the jitter suppression characteristics, it may become necessary for the PLL to have the cut-off frequency of 1 Hz or less. In this case, the pull-in time becomes approximately 3 s. As a result, it may become difficult to reduce the switching time to 50 ms or less.

SUMMARY

According to an aspect of the present invention, a transmission device includes a receiver receiving a signal transmission frame from a network, a client signal being mapped to the signal transmission frame; a separator separating the client signal from the signal transmission frame; a phase synchronizer generating a clock based on a frequency adjustment information set of the client information included in the signal transmission frame; a transmitter transmitting the client signal to a client transmission path by using the clock generated by the phase synchronizer; a memory storing the frequency adjustment information set included in the signal transmission frame in response to receiving the signal transmission frame from the network by the receiver; and a switch controller causing the phase synchronizer to generate a clock based on the frequency adjustment information set stored in the memory in response to not receiving the signal transmission frame from the network by the receiver.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 9 illustrates an example format of an OTUk frame;

DESCRIPTION OF EMBODIMENT

In the following, embodiments of the present invention are described.

<Transmission Device of OTN Transmission System>

Figure 1:
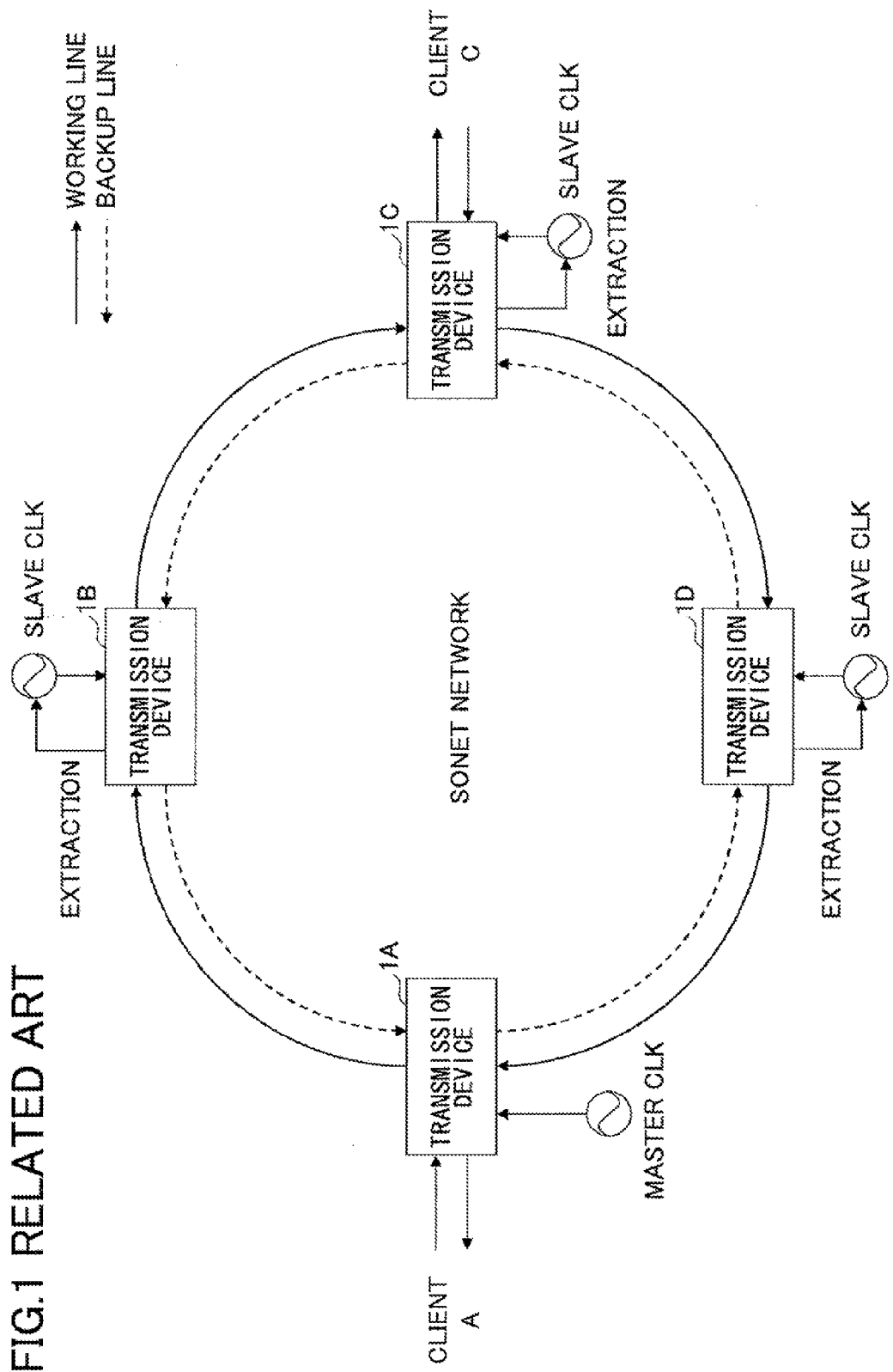
FIG. 1 illustrates an example network configuration of a SONET transmission system of related art.
Figure 2:
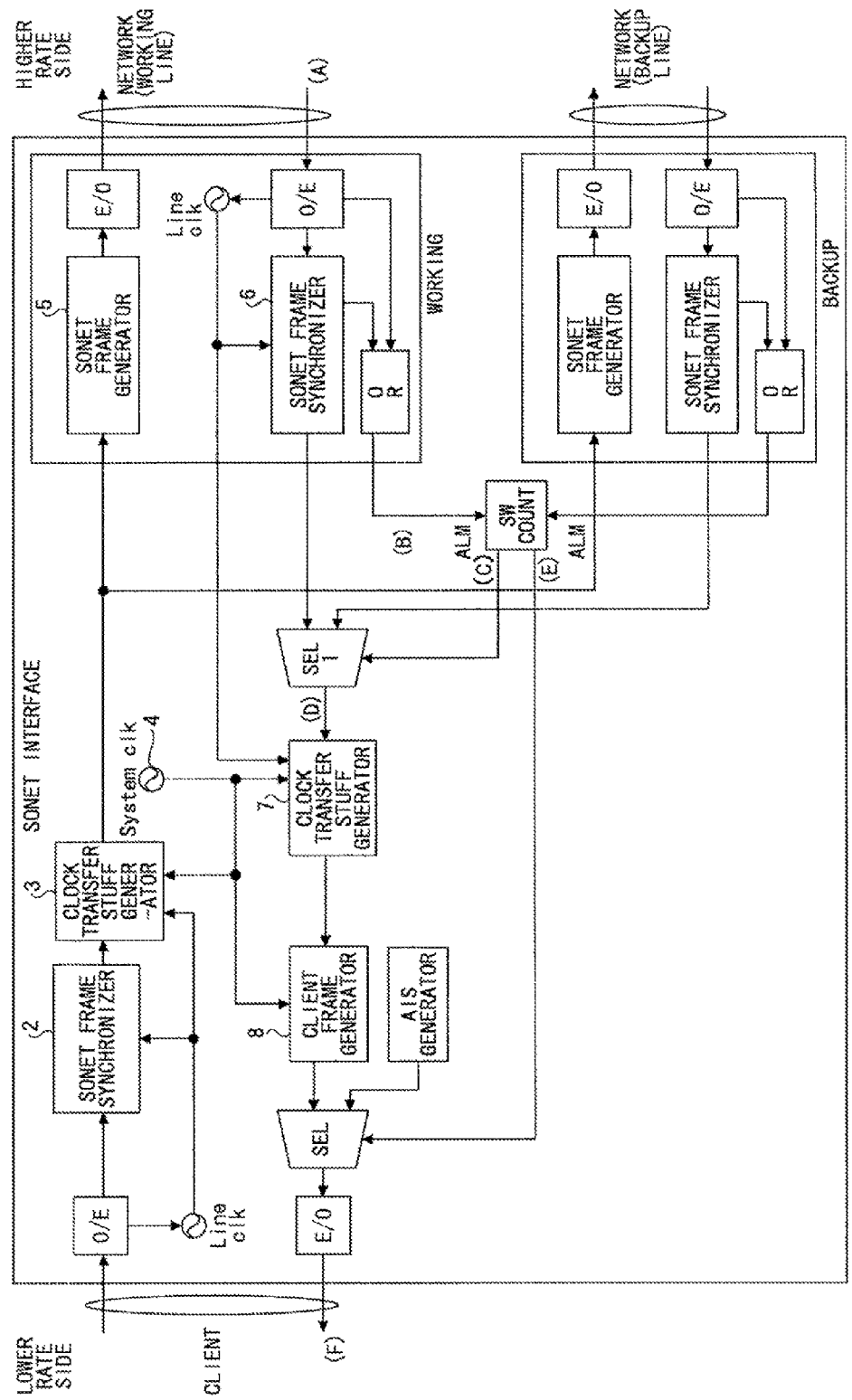
FIG. 2 illustrates an example configuration of a transmission device in the SONET transmission system.
Figure 3:
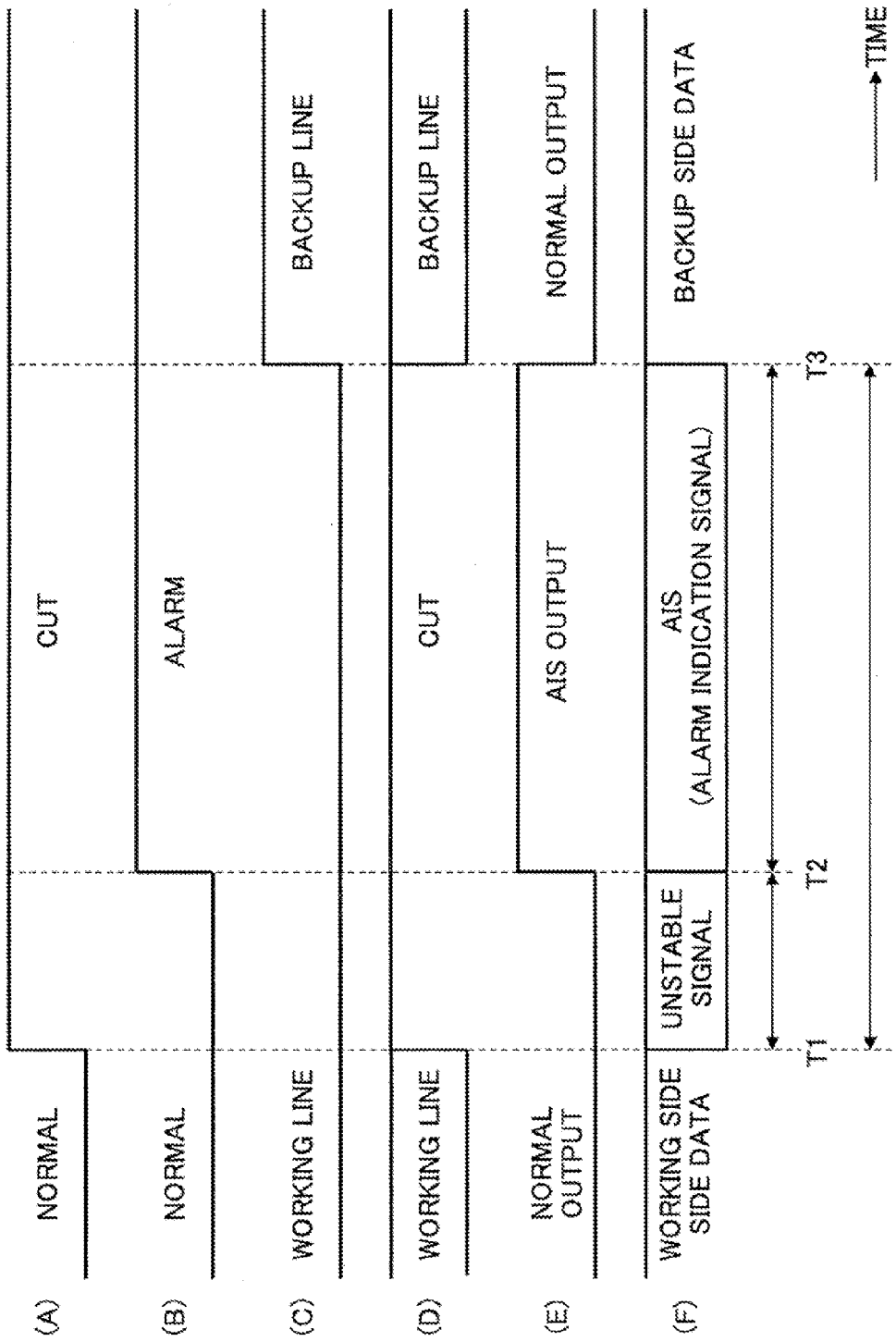
FIG. 3 is an example time chart of a switching operation to select a backup line.
Figure 4:
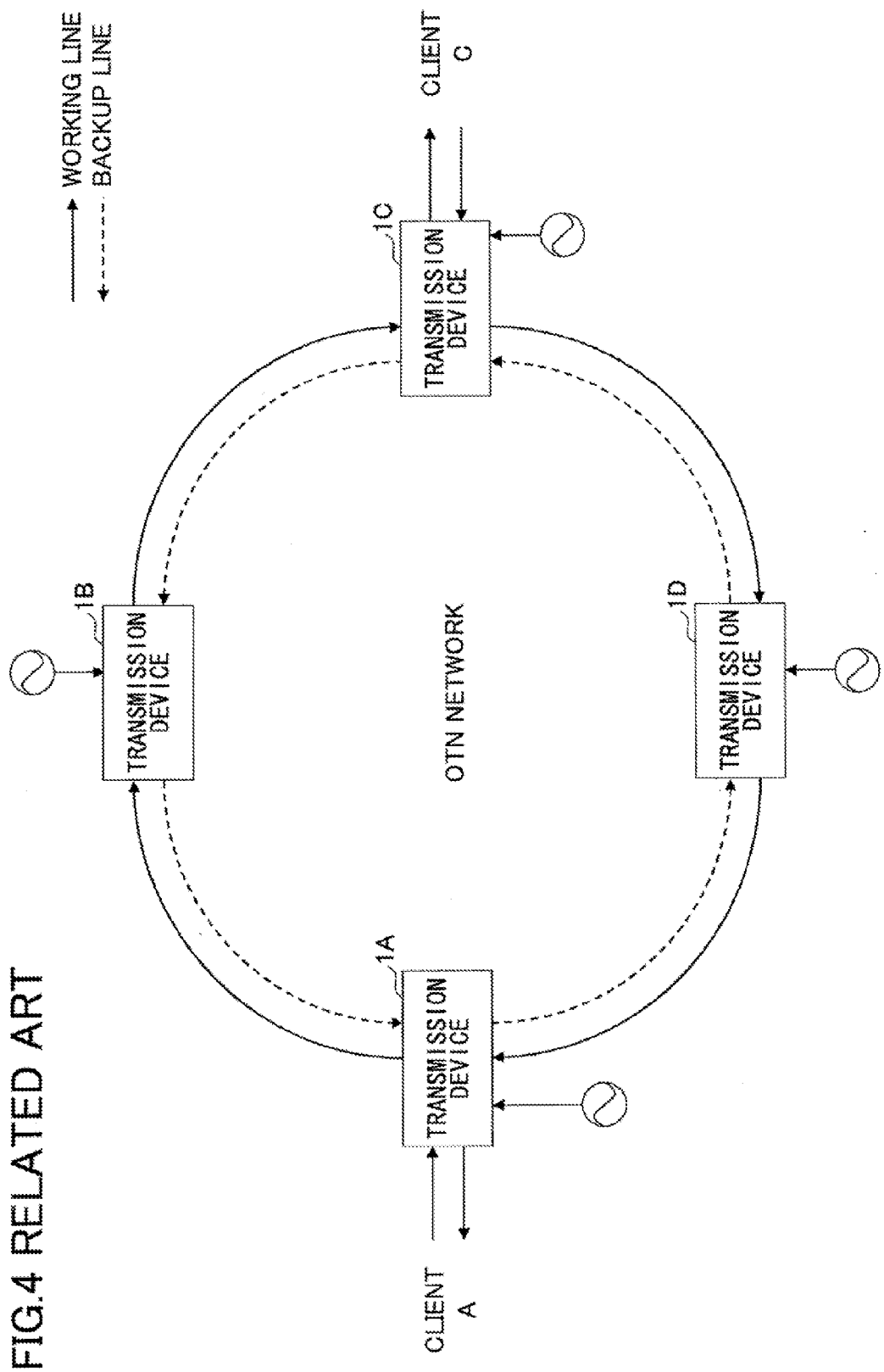
FIG. 4 illustrates an example network configuration of an OTN transmission system of related art.
Figure 5:
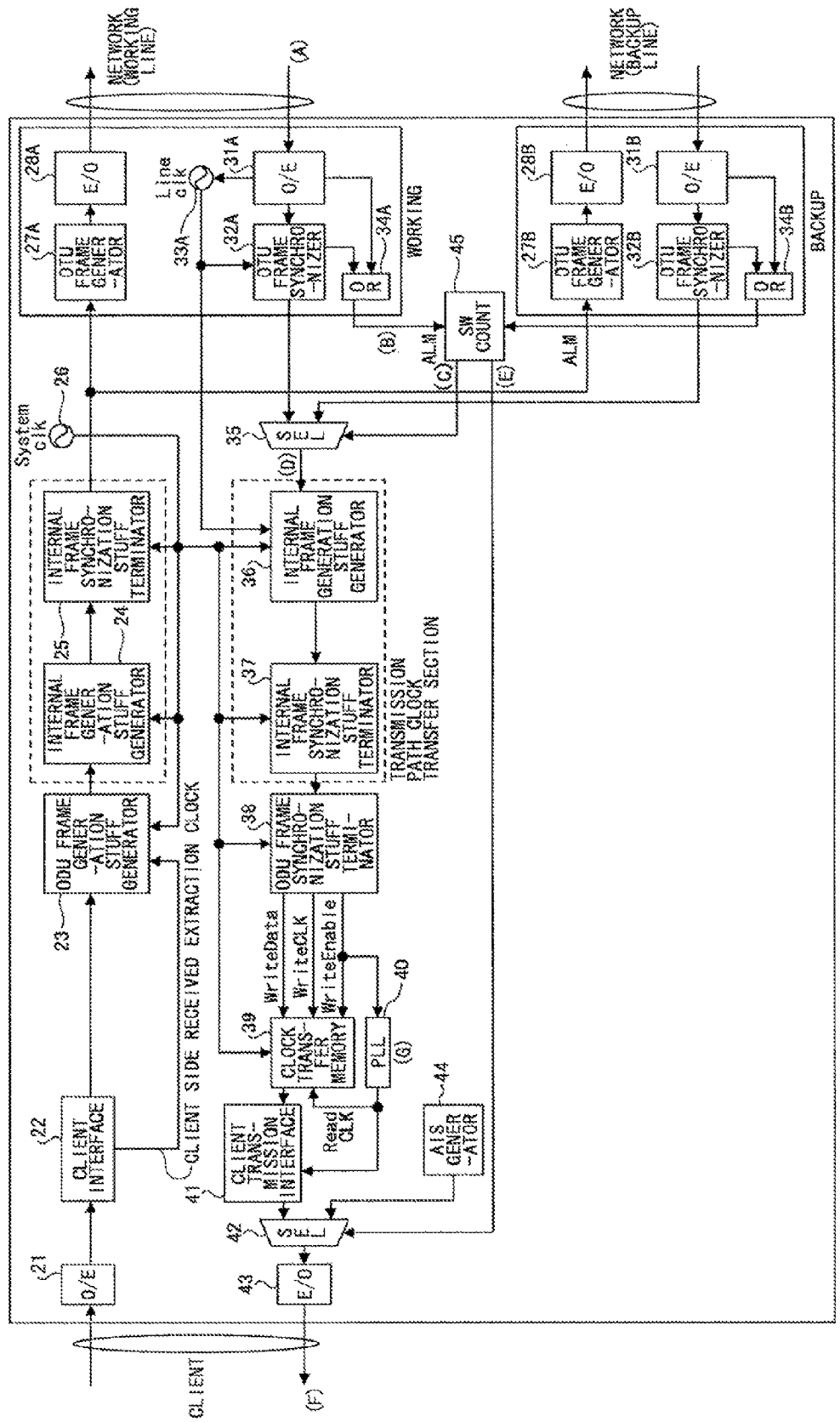
FIG. 5 illustrates an example configuration of a transmission device in the OTN transmission system.
Figure 6:
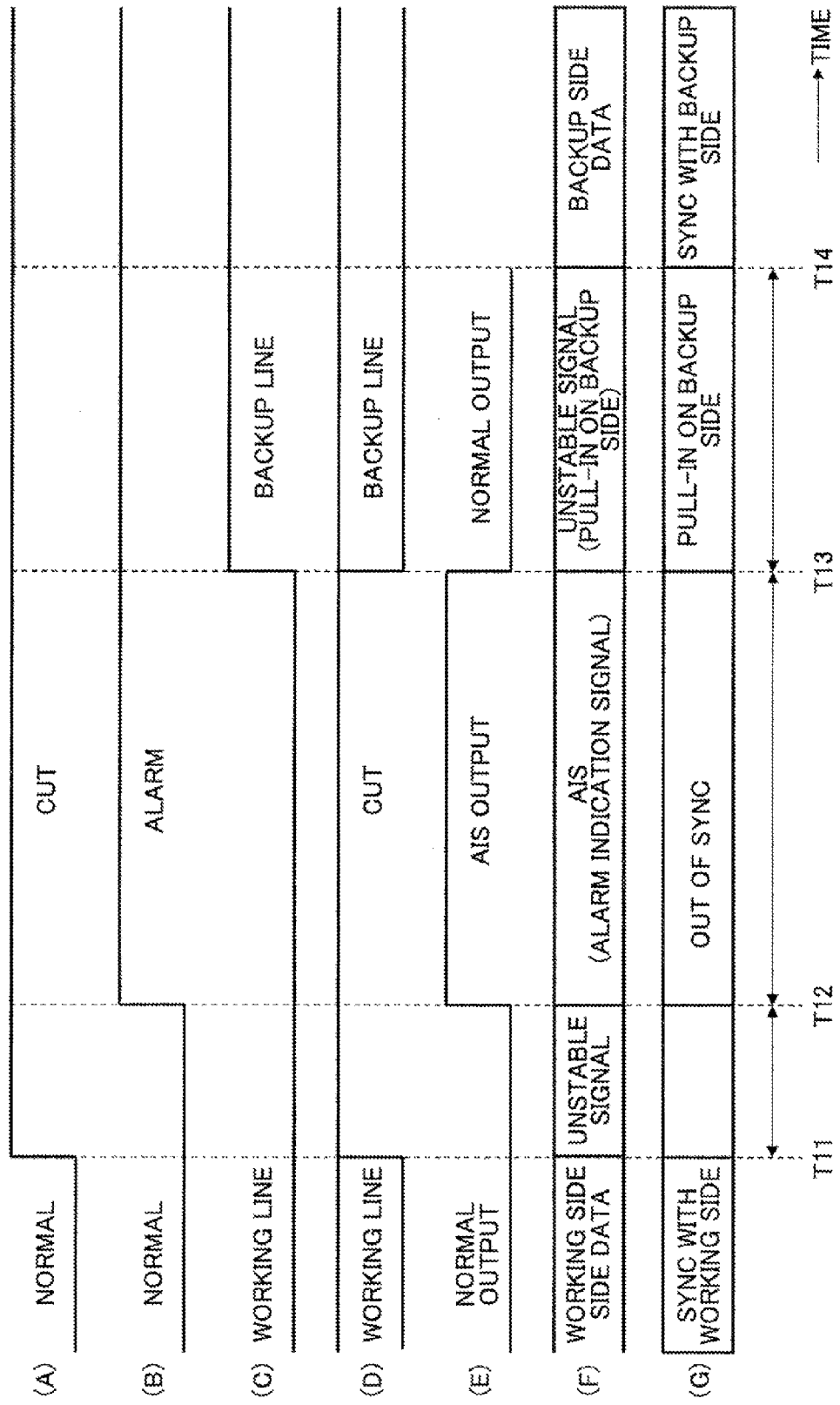
FIG. 6 is an example time chart of a switching operation to select a backup line.
Figure 7:
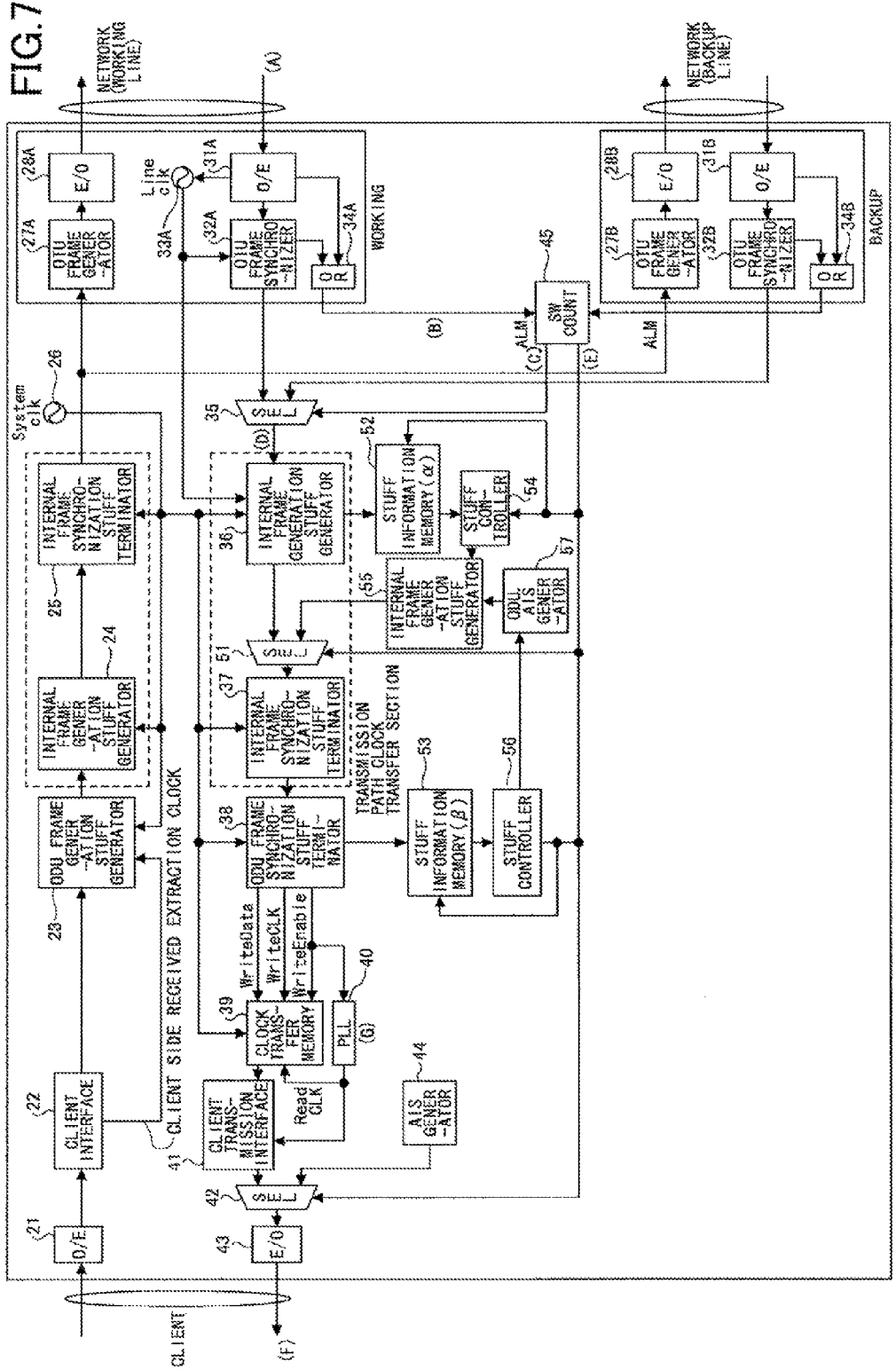
FIG. 7 illustrates an example configuration of a transmission device according to an embodiment in an OTN transmission system.

FIG. 7 illustrates an example configuration a transmission device according to an embodiment in the OTM transmission system. For example, the transmission device illustrated in FIG. 7 may be used as the transmission devices 1A, 1B, 1C, and 1D of the OTN transmission system in FIG. 4. In FIG. 7, the same reference numerals are used to describe the same elements as those in FIG. 5.

In FIG. 7, the client signal from the client transmission path is converted into an electric signal by the O/E (Optical/Electronic) converter 21 and transmitted to the client interface 22. The client interface 22 extracts the client clock from the electric signal. Then, the electric signal is transmitted to the ODU frame generation stuff generator 23.

The ODU frame generation stuff generator 23 maps the client signal to the ODUk frame. In this case, the JC (Justification Control) bytes as the stuff information as the frequency adjustment information of the client signal are added to the overhead of the ODUk frame. Further, based on the JC bytes, the stuff bytes to absorb the time-domain fluctuation of the client signal are inserted into the payload area or the overhead area of the ODUk frame.

Here, as a frequency adjustment method, there are AMP (Asynchronous Mapping Procedure) and GMP (Generalized Mapping Procedure).

Figure 9:
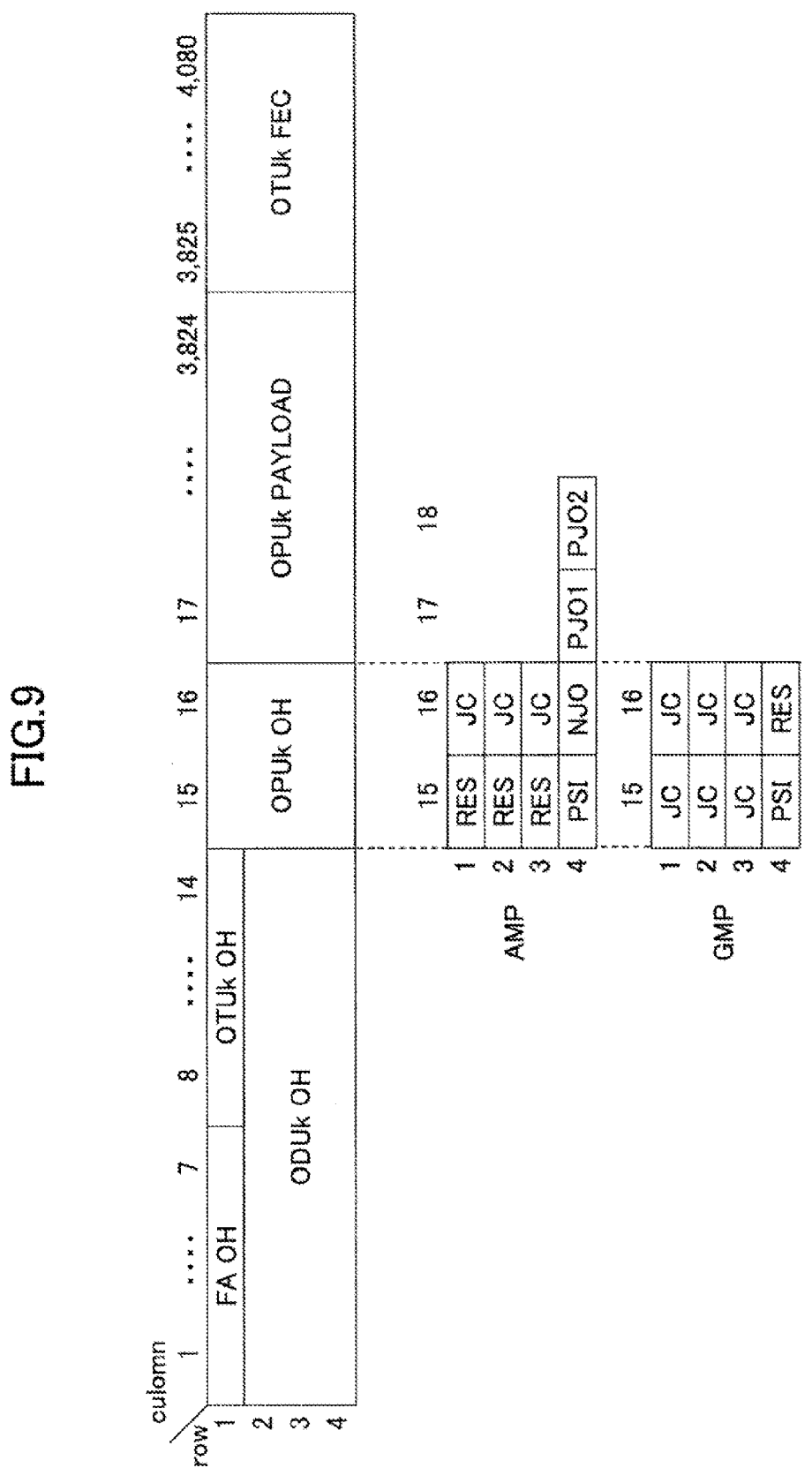

In AMP, by using three bytes of the JC byte and a NJO (Negative Justification Opportunity) byte of the OPUk overhead and a PJO (Positive Justification Opportunity) byte of the OPUk payload part, based on the JC byte information, data or stiff bytes (zero) are inserted (stuffed) into the NJO byte and the PJO byte. Namely, the stuff position where the stuff byte is inserted is a fixed position. On the other hand, in GMP, based on six bytes of the JC byte information of the OPUk overhead, the stuff byte is evenly inserted into the OPUk payload part. The JC byte of the AMP and the GMP is illustrated in FIG. 9 described below.

The ODUk frame output from the ODU frame generation stuff generator 23 is mapped to the internal frame by the internal frame generation stuff generator 24. In the internal frame, the JC byte as the frequency adjustment information is added to the overhead area, and the stuff byte is added to the payload part in accordance with the GMP.

The internal frame is transmitted through a cross connector and a multiplex separator (which are not shown) and terminated by an internal frame synchronization stuff terminator 25 so as to be the ODUk frame.

The clock generator 26 generates the system clock and supplies the system clock to the ODU frame generation stuff generator 23, the internal frame generation stuff generator 24, the internal frame synchronization stuff terminator 25 and the like.

Further, the overhead and the FEC are added to the ODUk frame by the OTU frame generators 27A and 28B for the working line and the backup line, respectively, so as to become OTUk frames. The OTUk frames are converted into optical signals by E/O (Electronic/Optical) converters 28A and 28B, and transmitted to the OTN network.

The OTU signal from the working line of the OTN network is converted into an electronic signal by the O/E (Optical/Electronic) converter 31A and terminated by the OTU frame synchronizer 32A so as to become the ODUk frame and be supplies to the selector 35.

The clock generator 33A generates the clock extracted from the OTU signal and in synchronization with the network clock, and supplied the generated clock to the OTU frame synchronizer 32A, the internal frame generation stuff generator 36 described below, and the like.

Similarly, the OTU signal from the backup line of the OTN network is converted into an electronic signal by the O/E (Optical/Electronic) converter 31B and terminated by the OTU frame synchronizer 32B so as to become an ODUk frame and be supplied to the selector 35.

The ODUk frame selected by the selector 35 is mapped to the internal frame by the internal frame generation stuff generator 36. In this case, the stuff to absorb the time-domain fluctuation of the OTUk frame in the OTN network is generated and inserted into the internal frame.

In the internal frame, the JC byte as the frequency adjustment information is added to the overhead area, and the stuff byte is inserted into the payload part in accordance with the GMP. The internal frame is transmitted through the cross connector and the multiplex separator (which are not shown) and terminated by the internal frame synchronization stuff terminator 37 so as to be the ODUk frame. The internal frame generation stuff generator 36 supplies the stuff information to a stuff information memory 52.

The ODUk frame output from the internal frame synchronization stuff terminator 37 is supplied to the ODU frame synchronization stuff terminator 38. The ODU frame synchronization stuff terminator 38 terminates the ODUk frame, and supplies the data, the clock and the write enable signal in the payload area of the ODUk frame to the clock transfer memory 39. By doing this, the data in the payload area of the ODUk frame (i.e., the data of the client signal) are written into the clock transfer memory 39.

Further, the system clock from the clock generator 26 is supplied to the internal frame generation stuff generator 36, the internal frame synchronization stuff terminator 37, the ODU frame synchronization stuff terminator 38, the clock transfer memory 39 and the like.

The ODU frame synchronization stuff terminator 38 specifies the insert position where the stuff byte is to be inserted based on stuff information (JC byte) extracted from the overhead of the ODUk frame, prevents the writing in the overhead area and the stuff byte, and generates a write enable signal instructing (causing) the writing in a data part of the payload area.

Therefore, the write enable signal output from the ODU frame synchronization stuff terminator 38 is based on the transmission rate (i.e., the stuff information) of the client signal in the transmission device on the transmission side. Further, the ODU frame synchronization stuff terminator 38 supplies the stuff information to a stuff information memory 53.

Further, the write enable signal output from the ODU frame synchronization stuff terminator 38 is supplied to the PLL 40. As the read clock, the PLL 40 generates the clock in synchronization with the write enable signal and by smoothing the client signal. The PLL 40 supplies the generated read clock to the clock transfer memory 39 and a client transmission interface 41.

Based on the read clock, the data of the client signal are read from the clock transfer memory 39 and are output as the client signal from the client transmission interface 41. The client signal is transmitted through the selector 42 and converted into an optical signal by the E/O (Electronic/Optical) converter 43 to be transmitted to the client transmission path.

The alarm signals from the O/E converter 31A and detected by the OTU frame synchronizer 32A for the working line are transmitted to the switch controller (SW CONT) 45 via the OR circuit 34A. Similarly, the alarm signals from the O/E converter 31B and detected by the OTU frame synchronizer 32B for the backup line are transmitted to the switch controller 45 via the OR circuit 34B. Further, for example, the OTU frame synchronizers 32A and 32B detect an alarm when five consecutive frames are different in the frame pattern of the ODUk frame.

Based on the first control signal from the switch controller 45, the selector 35 selects one of the output signals from the OTU frame synchronizers 32A and 32B, and supplies the selected output signal to the internal frame generation stuff generator 36. On the other hand, based on the second control signal from the switch controller 45, the selector 42 selects either the client signal output from the client transmission interface 41 or the AIS (Alarm Indication Signal) generated by the AIS generator 44, and supplies the selected signal to the E/O converter 43.

In a normal state, based on the second control signal from the switch controller 45, stuff information $\alpha$ is written from the internal frame generation stuff generator 36 into the stuff information memory 52, and stuff information $\beta$ is written from the ODU frame synchronization stuff terminator 38 into the stuff information memory 53.

Further, in a failure (abnormal) state, based on the second control signal to a stuff controller 54, the stuff controller 54 reads the stuff information α from the stuff information memory 52, the stuff information α having been written (stored) in the normal state. Then, the stuff controller 54 supplies the stuff information α to an internal frame generation stuff generator 55.

Further, a stuff controller 56 reads the stuff information β from the stuff information memory 53, the stuff information β having been stored in the normal state, and supplies the stuff information β to an ODU.AIS generator 57. Then, the ODU.AIS generator 57 generates a failure-reporting ODUk frame including the stuff information β in the overhead and data "1" in the entire payload area, and supplies the failure-reporting ODUk frame to the internal frame generation stuff generator 55.

The internal frame generation stuff generator 55 generates a failure-reporting internal frame by mapping the failure-reporting ODUk frame to the internal frame. Further, the stuff byte in accordance with the stuff information α is generated and inserted into the payload area of the failure-reporting internal frame.

Further, in the failure state, in response to the second control signal, a selector (SEL) 51 selects the failure-reporting internal frame from the internal frame generation stuff generator 55, and supplies the failure-reporting internal frame to the internal frame synchronization stuff terminator 37. The internal frame synchronization stuff terminator 37 terminates the failure-reporting internal frame to become a failure-reporting ODUk frame, and supplies the failure-reporting ODUk frame to the ODU frame synchronization stuff terminator 38.

The ODU frame synchronization stuff terminator 38 terminates the failure-reporting ODUk frame, and supplies the data (having only "1") in the payload area, the clock, and the write enable signal to the clock transfer memory 39, and supplies the write enable signal to the PLL 40. The write enable signal is based on the stuff information β in the failure-reporting ODUk frame. Therefore, the PLL 40 maintains an in-synchronization state.

After that, in response to the first and the second control signals, a switching operation is performed so that the selector 35 selects the ODUk frame from the backup line, and the selector 51 selects the ODUk frame from the internal frame synchronization stuff terminator 37. Further, the PLL 40 is in synchronization with the write enable signal which is based on the stuff information extracted from the ODUk frame.

This synchronization in this case does not require the extraction of the clock due to being out-of-synchronization (i.e., eliminate pull-in time for extracting the clock in the PLL 40); therefore, the synchronization may be performed (completed) rapidly (much faster). In this case, the selector 42 selects the AIS generated by the AIS generator 44, so that the AIS is converted into the optical signal by the E/O converter 43, and transmitted to the client transmission path.

Figure 8:
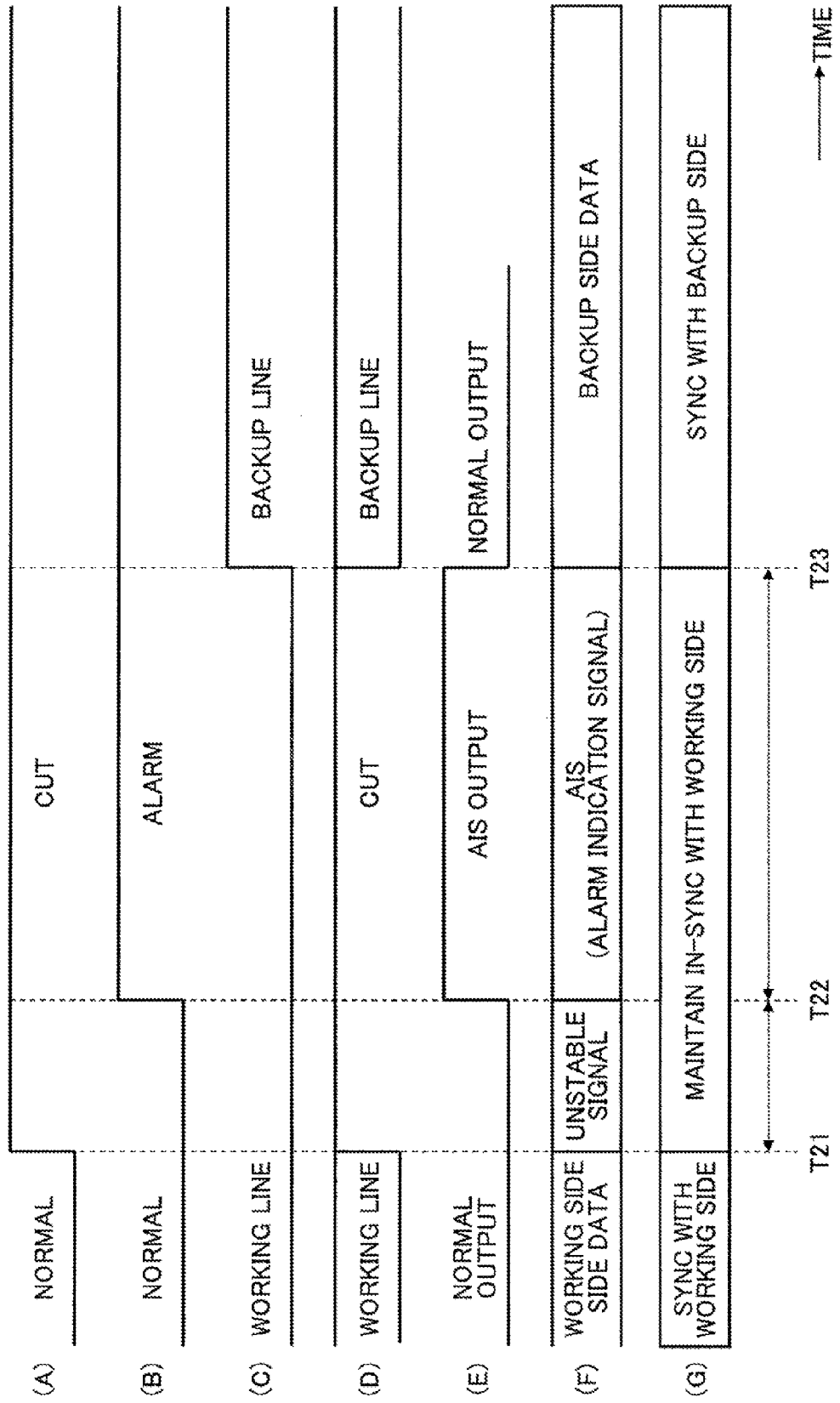
FIG. 8 is an example time chart of a switching operation to select a backup line.

The redundant switching operation of the OTN transmission system is described. Namely, the operations when the working line in the OTN transmission system of FIG. 7 is cut and the switching to the backup line are described with reference to a time chart of FIG. 8. In FIGS. 7 and 8, the symbol (A) denotes a state of the working line on the network side. The symbol (B) denotes an alarm detection result of the working line on the network side.

The symbol (C) denotes a first control signal output from the switch controller 45 to select either the working line or the backup line on the network side. The symbol (D) denotes a state of the selected line. The symbol (E) denotes a second control signal output from the switch controller 45 so as to transmit (report) the AIS reporting an occurrence of a failure (an error) to the upper layer. The symbol (F) denotes an output signal of the interface on the client side. The symbol (G) denotes the operations of the PLL 40.

In the time chart of FIG. 8, at time T21, a failure due to a line cut or the like occurs in the working line on the network side. Then, at time T22, the OTU frame synchronizer 32A on the network side detects the alarm indicating the line cut (the line cut alarm). Further, at time T23, the switching operation is performed under the control of the switch controller 45 switching from the working line to the backup line based on the line cut alarm.

The time required for the redundant switching operation is described below. The time for detecting the line cut alarm (alarm detection time, i.e., between T21 and T22) is approximately 1 ms or less. The time for the control to switch lines (switch control time, between T22 and T23) is approximately 40 ms or less. In this embodiment, the PLL 40 may not be in the out-of-sync state in the redundant switching operation.

Namely, the pull-in time for extracting the clock may be greatly reduced to almost none. Therefore, it may become possible to perform (complete) the redundant switching operation in approximately 50 ms or less.

<OTUk Frame Format>

FIG. 9 illustrates an example OTUk frame format in the OTN network. As illustrated in FIG. 9, the OTUk frame includes the overhead part, the OPUk (Optical channel Payload Unit, k is 0 or a positive integer) payload part, and an OTUkFEC (Optical channel Transport Unit k Forward Error Correction) part.

The overhead part has a size of 16 bytes (i.e., the first to the sixteenth columns) by 4 rows, and includes an FA (Frame Alignment) overhead, an OTUk overhead, an ODUk overhead, and an OPUk overhead. Those are used for the management of the connections and qualities.

The OPUk payload part has a size of 3880 bytes (i.e., the seventeenth to the 3824th columns) by 4 rows. The OTUk-FEC part has a size of 256 bytes (i.e., the 3825th to 4080th columns) by 4 rows, and is used for correction errors generated during transmissions.

The FA overhead (OH) includes an FAS (Frame Alignment Signal) which is a six-byte fixed frame pattern and an MFAS (MultiFrame Alignment Signal) which is a one-byte sequence number.

The multiple parts containing of the ODUk frame to HO_ODUk are realized (performed) by defining a TS (Tributary Slot) which is a time slot generated by dividing the OPUk (Optical Channel Payload Unit 'k') by the bytes into is parts, and containing the ODUj into each TS of the payload area of the HO_ODUk fame.

<Normal State>

Figure 10:
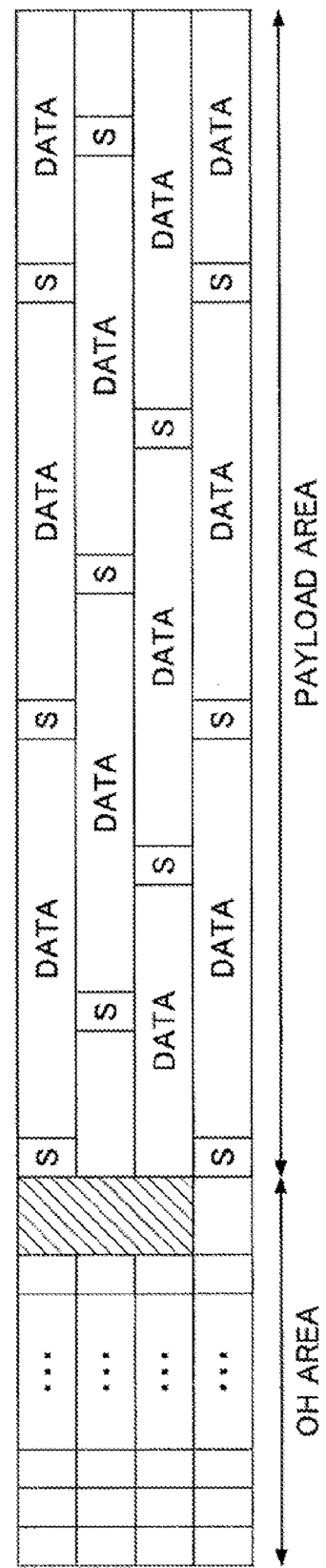
FIG. 10 illustrates an example internal frame in a normal state.

FIG. 10 illustrates an example configuration of the internal frame output from the internal frame generation stuff generator 36 based on the selection by the selector 51. In the configuration of FIG. 10, as the stuff information, the JC byte (having, for example, 6 bytes) based on the GMP is stored in a predetermined hatched area in the overhead of the internal frame.

The stuff information corresponds to the stuff information α stored in the stuff information memory 52. In the payload area of the internal frame, there are stuff bytes ("S") inserted between data ("DATA") in accordance with the stuff information.

For example, when an ODU0 frame is stored in the internal frame, the data amount stored in the payload area (e.g., 16000 bytes) of the internal frame is 15232 bytes. This data amount is stored in the JC bytes.

Figure 11:
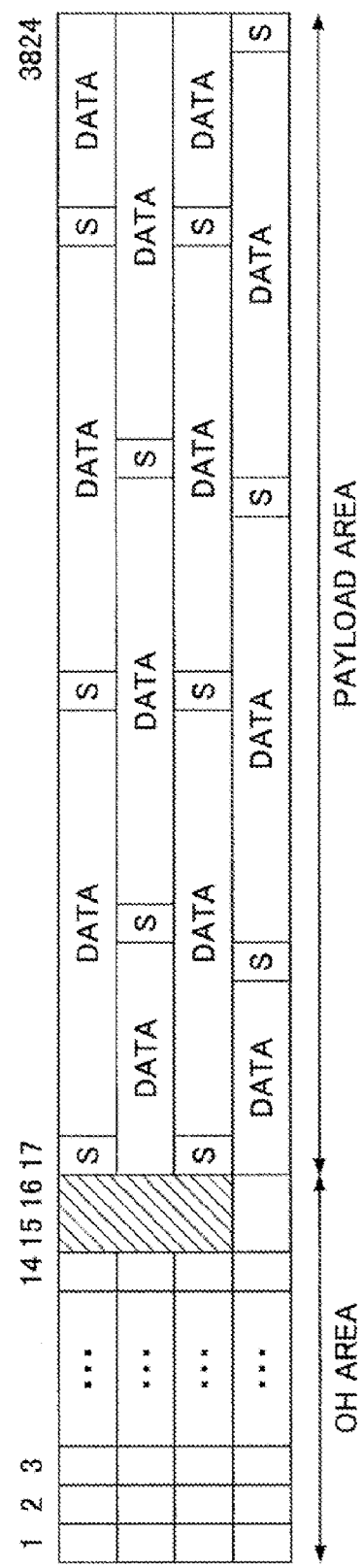
FIG. 11 illustrates an example OTUk frame in a normal state.

FIG. 11 illustrates an example configuration of the ODUk frame which is supplied from the internal frame synchronization stuff terminator 37 to the ODU frame synchronization stuff terminator 38 in the normal state.

As the stuff information, the JC bytes based on the GMP or the AMP are stored in the hatched area defined by the first through the third rows and the fifteenth and sixteenth columns in the overhead of the ODUk frame. The stuff information corresponds to the stuff information β stored in the stuff information memory 53.

In the payload area of the ODUk frame, there are stuff bytes ("S") inserted between data ("DATA") in accordance with the stuff information. For example, when a gigabit Ethernet (GbE) having 1.25 Gbps or an OC3 (Optical Carrier-3) having 155.52 Mbps is stored in the ODU0 frame, the data amount stored in the payload area (15232 bytes) is 14407 bytes or 1912 bytes, respectively.

Those data amount are stored in the JC bytes. Based on the JC bytes, the ODU frame synchronization stuff terminator 38 generates the write enable signal.

Figure 12:
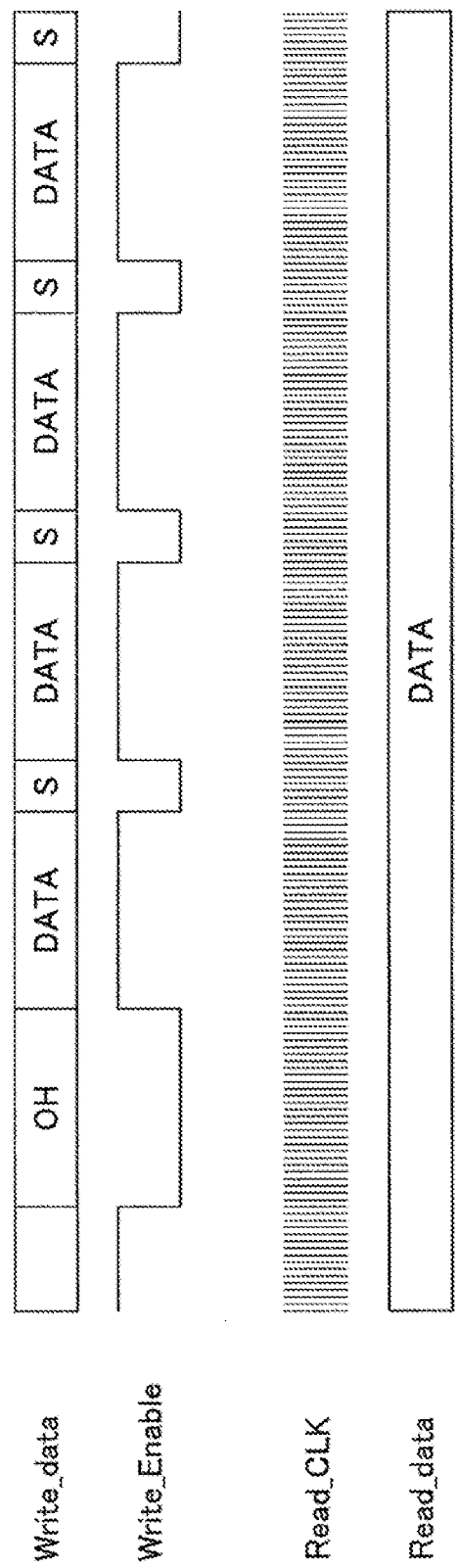
FIG. 12 is an example time chart of a clock transfer memory operation in a normal state.

FIG. 12 is an example time chart of the operations of the clock transfer memory 39 in the normal state. In FIG. 12, the "Write_data" denotes the data of the payload area of the ODUk frame supplied from the internal frame synchronization stuff terminator 37.

The "Write_Enable" denotes the write enable signal from the internal frame synchronization stuff terminator 37. The write enable signal instructs the data write to the clock transfer memory 39 while the level is high.

The "Read_CLK" denotes the clock smoothed by synchronizing with the write enable signal by the PLL 40, and is in synchronization with the client signal. The clock transfer memory 39 reads the data "Read_data" by using the clock "Read_CLK".

<Failure Occurs on Network Side>

Figure 13:
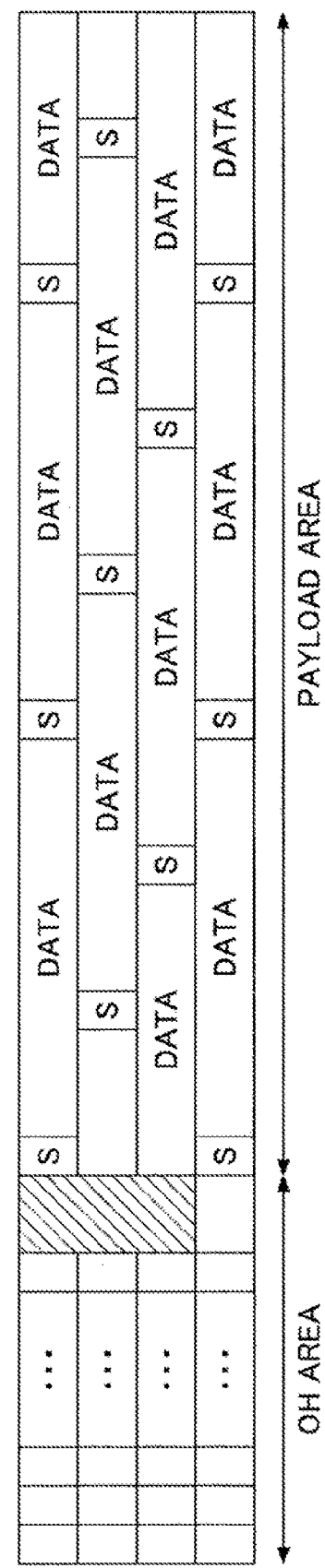
FIG. 13 illustrates an example internal frame in a failure state.

FIG. 13 illustrates an example configuration of the internal frame output from the internal frame generation stuff generator 55 and selected by the selector 51 when the alarm is detected (at T22) in a case where a failure occurs on the network side.

In the internal frame, the stuff information α read from the stuff information memory 52 is stored in the JC byte at a predetermined hatched position in the overhead. Further, all the data in the payload area (DATA) is "1".

Figure 14:
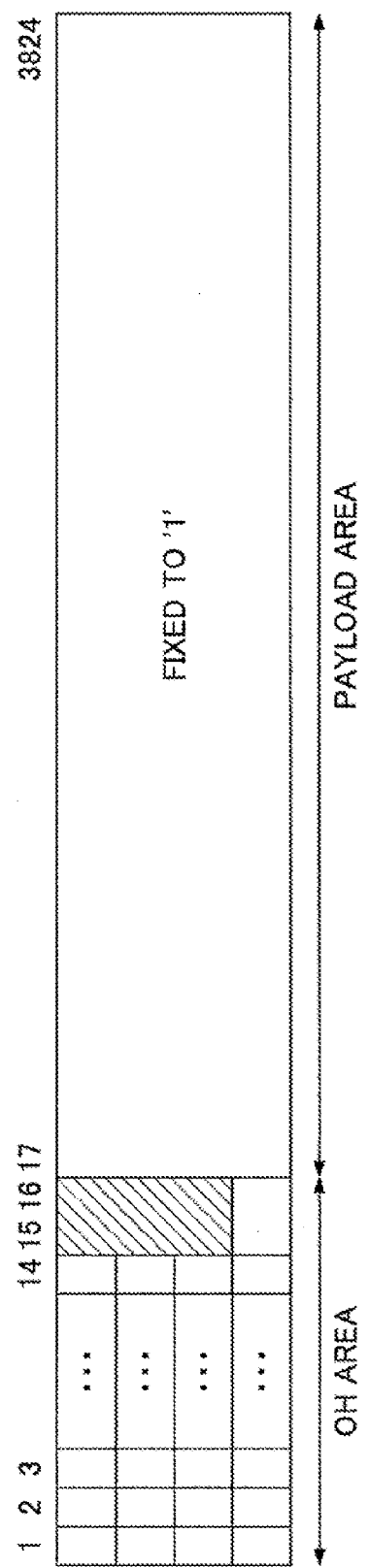
FIG. 14 illustrates an example OTUk frame in a failure state.

FIG. 14 illustrates an example configuration of the ODUk frame supplied from the internal frame synchronization stuff terminator 37 to the ODU frame synchronization stuff terminator 38 when an alarm is detected.

In the ODUk frame, the stuff information β read from the stuff information memory 52 is stored in the JC bytes at the hatched area defined by the first through the third rows and the fifteenth and sixteenth columns. Further, all the data in the payload area (DATA) is "1".

Figure 15:
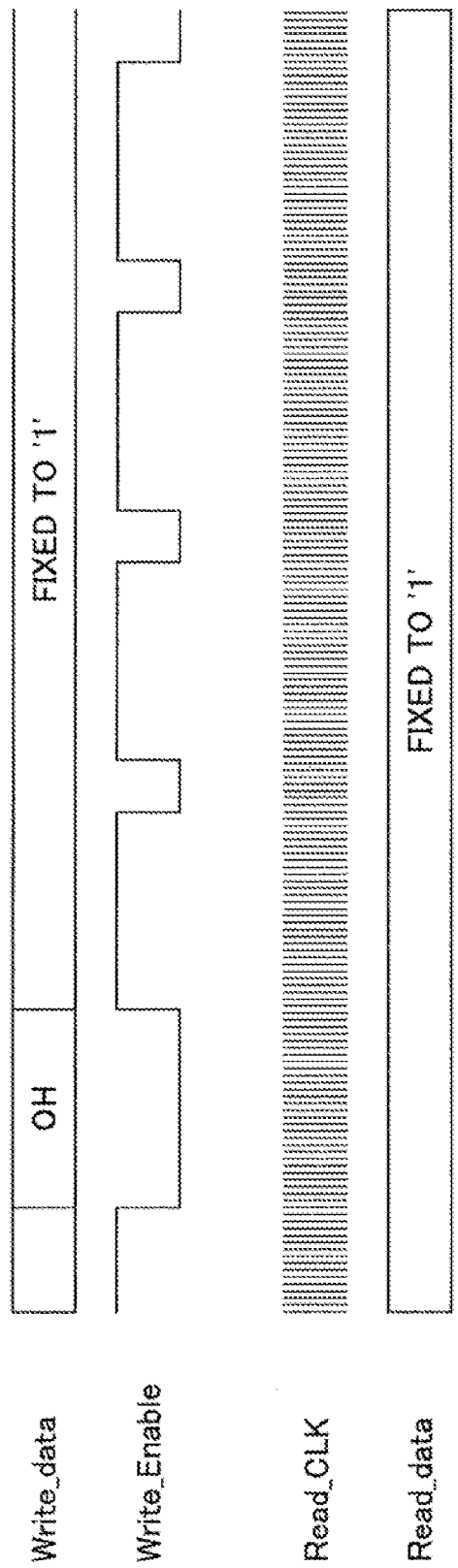
FIG. 15 is an example time chart of the clock transfer memory operation in a failure state.

FIG. 15 is an example time chart of the operations of the clock transfer memory 39 when an alarm is detected. In FIG. 15, the "Write_data" is fixed to "1". The "Write_Enable" is generated based on the stuff information β in the payload area of the ODUk frame.

The "Read-CLK" denotes a clock smoothed by synchronizing with the write enable signal by the PLL 40, and is in synchronization with the client signal. Namely, the PLL 40 maintains the synchronization state even when the alarm is detected. The data of the "Read_data" read from the clock transfer memory 39 is fixed to "1".

Figure 16:
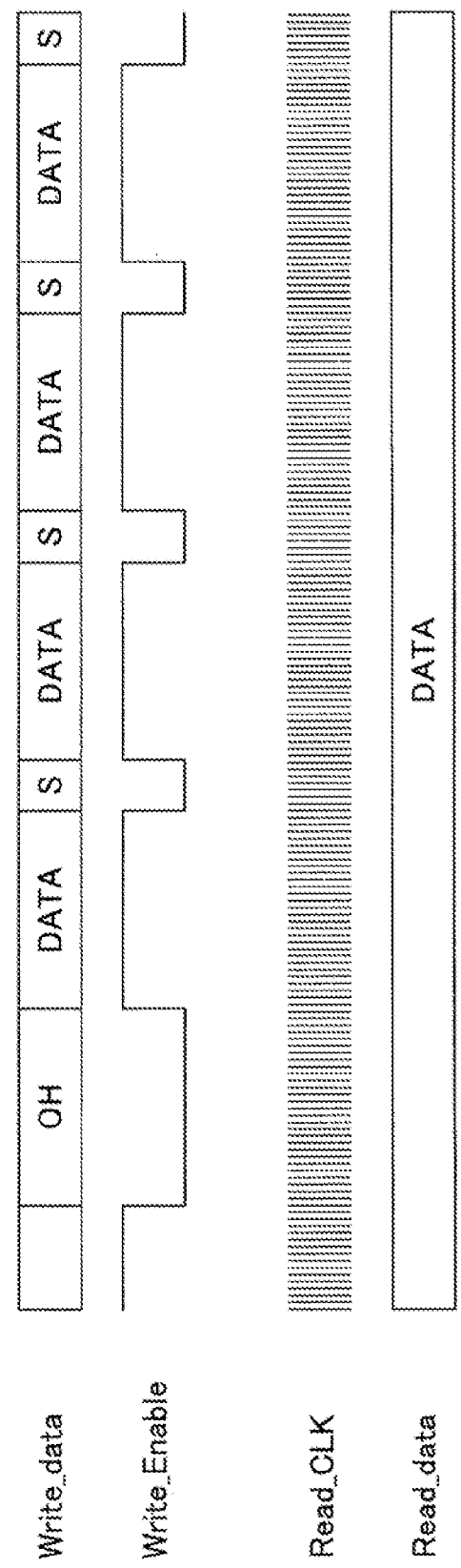
FIG. 16 is an example time chart of the clock transfer memory operation in switching.

FIG. 16 is an example time chart of the operations of the clock transfer memory 39 when the switching is performed at time T23. In FIG. 16, the "Write_data" denotes the data in the payload area of the ODUk frame supplied from the internal frame synchronization stuff terminator 37.

The "Write_Enable" denotes the write enable signal from the internal frame synchronization stuff terminator 37. Namely, the write enable signal is generated based on the stuff information of the ODUk frame from the backup line.

The "Read_CLK" denotes the clock smoothed by synchronizing with the write enable signal by the PLL 40, and is in synchronization with the client signal. The clock transfer memory 39 reads the "Read_data" using the clock of the "Read_CLK".

<Flowchart>

Figure 17:
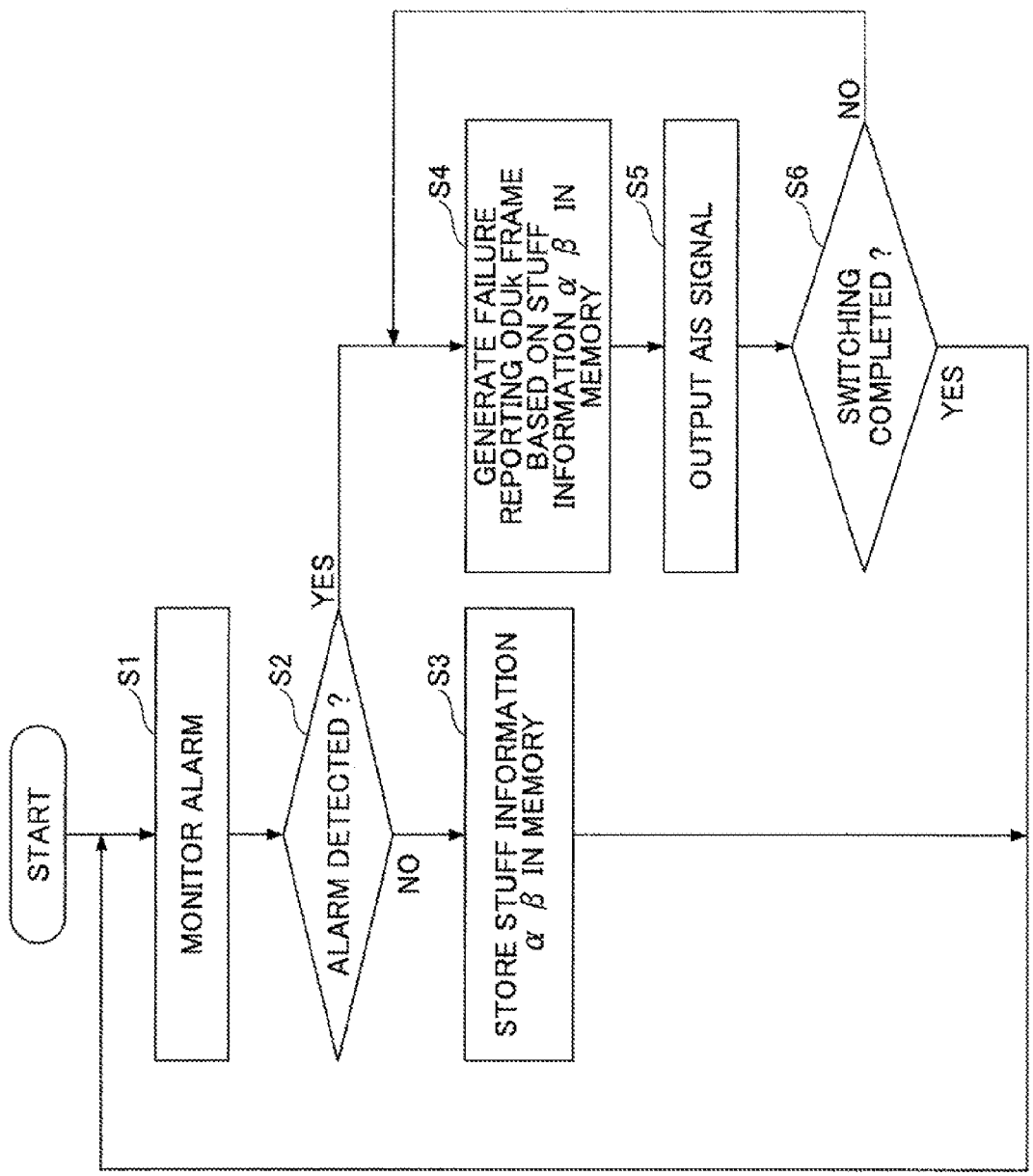
FIG. 17 is an example flowchart of switching between a work line and a backup line.

FIG. 17 is an example flowchart of the switching operation from the working line to the backup line. It should be noted that the terms "working line" and "backup line" are used for explanatory purposes only. Namely, when the switching operation has been completed, the "working line (line-A)" and the "backup line (line-B)" may be exchanged so that the line-A becomes the backup line and the line-B becomes the working line.

As illustrated in FIG. 17, in step S1, the OTU frame synchronizers 32A and 32B monitor an alarm. In step S2, the switch controller 45 determines whether the alarm is detected.

When determining that no alarm is detected (i.e., NO in step S2), the process goes to step S3. In step S3, the switch controller 45 sets the level of the first and the second control signals to "Low", so that the stuff information α and the stuff information β are stored into the stuff information memory 52 and the stuff information memory 53, respectively. After step S3, the process goes back to step S1.

On the other hand, when determining that the alarm is detected (YES in step S2), the process goes to step S4. In step S4, the switch controller 45 sets the level of the second control signal to "High", so that the internal frame generation stuff generator 55 maps the failure-reporting ODUk frame (including the stuff information β) to the internal frame to generate the failure-reporting internal frame (including the stuff information α).

Then, in step S5, based on the second control signal, the selector 42 selects and outputs the AIS from the AIS generator 44.

After that, in step S6, it is determined whether the line has been switched by determining whether the level of the second control signal is returned to "Low". When determining that the line has not been switched (NO in step S6), the process goes back to step S4.

On the other hand, when determining that the line has been switched, the process goes back to step S1.

<Stuff Information Memory>

Next, the stuff information memories 52 and 53 storing the stuff information α and β, respectively, are described. To perform the switching operation, it may be necessary for the stuff information memories 52 and 53 to store the stuff information α and β which comprise the information before a failure occurs (i.e., an alarm is detected) in the network side.

To that end, it may be necessary for the stuff information memories 52 and 53 to store (maintain) the stuff information longer than the time necessary to detect an alarm.

The condition for detecting (determining) the out-of-sync state of the OTU frame is that, for example, five consecutive frames are different in the frame pattern of the ODUk frame.

In the case of OTU1 (2.7 Gbps), the alarm detection time D1 is 244.9 μs (=5×48.971 μs (one frame)), and in the case of OTU2 (10.7 Gbps), the alarm detection time D1 is 61.0 μs (=5×12.191 μs (one frame)).

Further, it may also be possible to store the stuff information α and β for an accumulation time D2 and repeatedly use the stuff information α and β accumulated for the accumulation time D2 in the reception order under the control of the stuff controllers 54 and 56.

When the frequency of the client signal is shifted from the center frequency by Z ppm, the time T which is required to accumulate 8 bits of the surplus or the deficit of the client signal is expressed as T=8/(fc×Z). The time T is defined as the accumulation time D2.

For example, when the client signal is OC48, fc=2.48832 GHz. In this case, when Z=10 ppm and 1 ppm, the T=0.32 ms (10 ppm) and 3.2 ms (1 ppm), respectively. When a failure occurs (an alarm is detected) in the network side, to reproduce the client signal with the accuracy of 1 ppm relative to the frequency response in a normal state, it may become necessary to store the stuff information α and β for 3.2 ms or more.

Figure 18:
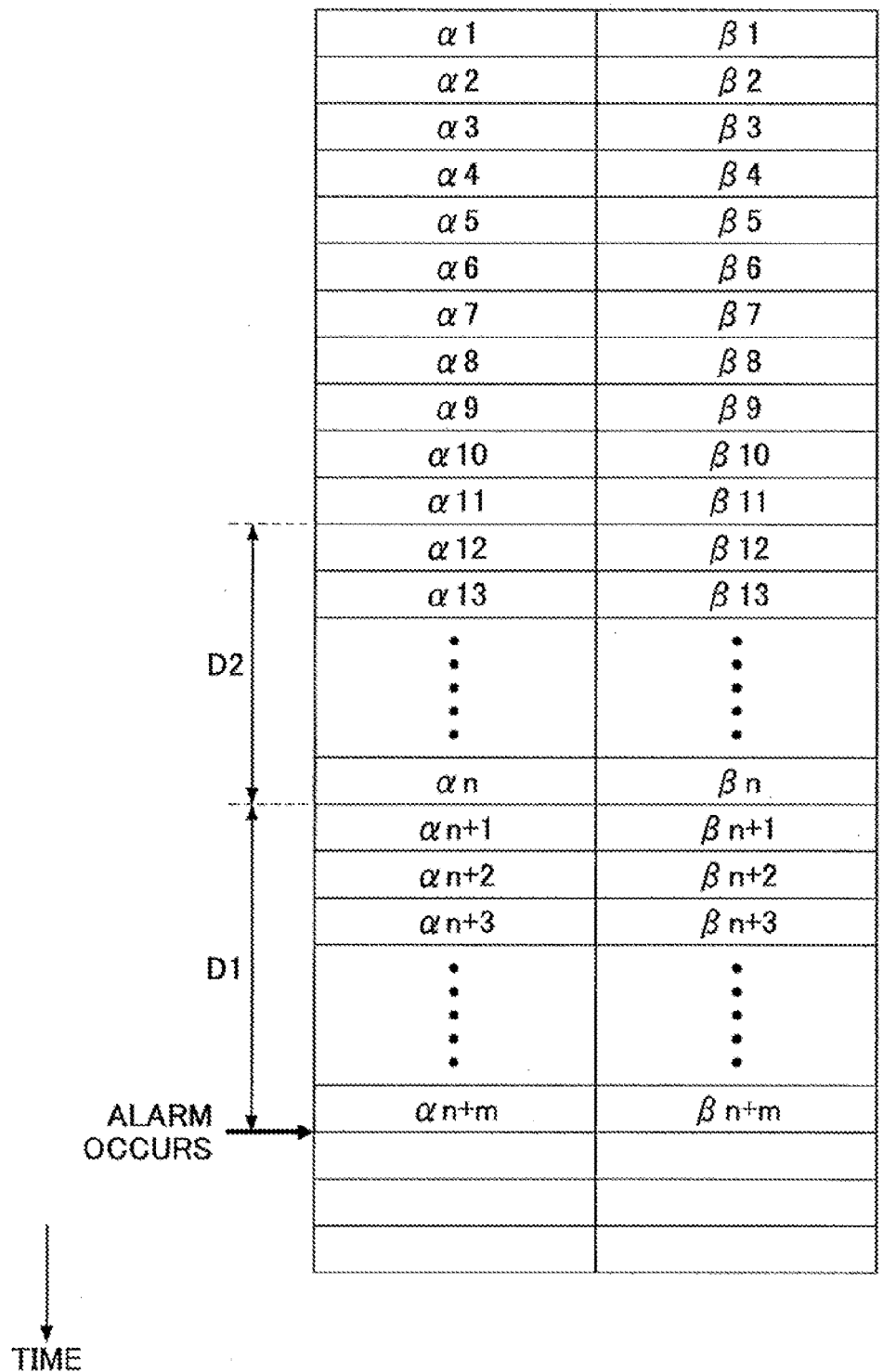
FIG. 18 illustrates an example stuff information memory.

FIG. 18 is an example configuration of the stuff information memories 52 and 53. In the case of FIG. 18, at least n+m stuff information α and β (i.e., stuff information α1, β1, ..., αn+m, βn+m) are stored in the stuff information memories 52 and 53, respectively.

Further, at the timing when the stuff information αn+m and βn+m are stored, an alarm is detected in the signal on the network side. In this case, the timing before the alarm detection time D1 is set as a reference timing. Then the stuff information α12, β12, ..., αn, βn in the accumulation time D2 before the reference timing (see FIG. 18) are repeatedly read, so that the failure-reporting ODUk frame (including the stuff information β) is mapped to the internal frame to generate the failure-reporting internal frame (including the stuff information α).

Further, alternatively, for example, one stuff information α12, and one stuff information β12 may be repeatedly read, so that the failure-reporting ODUk frame is mapped to the internal frame to generate the failure-reporting internal frame.

The transmission device according to this embodiment may be provided simply by adding the selector 51, the stuff information memories 52 and 53, the stuff controllers 54 and 56, the internal frame generation stuff generator 55, and the ODU.AIS generator 57.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present inventions has been described in detail, it is to be understood that various changes, substitutions, and alterations could be made hereto without departing from the sprit and scope of the invention.

What is claimed is:

1. A transmission device comprising:
a receiver configured to receive a signal transmission frame from a network, the signal transmission frame having a client signal mapped thereto;
a first separator configured to separate the client signal from the signal transmission frame;
a phase synchronizer configured to generate a clock based on a frequency adjustment information set of the client information included in the signal transmission frame;
a transmitter configured to transmit the client signal to a client transmission path using the clock generated by the phase synchronizer;
a memory configured to store the frequency adjustment information set included in the signal transmission frame in a case in which the receiver receives the signal transmission frame from the network; and
a switch controller configured to switch the phase synchronizer from a state in which the clock is generated based on the frequency adjustment information set of the client information included in the signal transmission frame received by the receiver, to a state in which the clock is generated based on the frequency adjustment information set stored in the memory, in a case in which the receiver receives no signal transmission frame from the network.

2. The transmission device according to claim 1,
wherein the memory is configured to sequentially store a plurality of frequency adjustment information sets in a receiving order, the plurality of frequency adjustment information sets being included in respective signal transmission frames.

3. The transmission device according to claim 2,
wherein the switch controller is configured to control the phase synchronizer to generate the clock by repeatedly reading the frequency adjustment information sets included in a predetermined time range from amongst the plurality of frequency adjustment information sets stored in the memory.

4. The transmission device according to claim 3,
wherein the receiver is configured to receive the signal transmission frame from a working line and a backup line of the network,
wherein the memory is configured to store the frequency adjustment information set included in the signal transmission frame in a case in which the receiver receives the signal transmission frame from the working line of the network, and
wherein the switch controller is configured to control the phase synchronizer to generate the clock based on the frequency adjustment information set stored in the memory and to thereafter generate the clock based on the frequency adjustment information set included in the signal transmission frame received by the receiver from the backup line of the network, in the case in which the receiver receives no signal transmission frame from the working line of the network.

5. The transmission device according to claim 4, further comprising:
a mapping unit configured to map the signal transmission frame received from the network to an internal frame of the transmission device, the frequency adjustment information set of the signal transmission frame of the network being added to the internal frame; and
a second separator configured to separate the client signal from the signal transmission frame separated from the internal frame,
wherein the memory is configured to sequentially store the frequency adjustment information sets of the signal transmission frames included in respective internal frames and the frequency adjustment information sets of a plurality of client signals included in respective signal transmission frames in a receiving order, in the case in which the receiver receives the signal transmission frame from the network, and wherein the switch controller is configured to generate the signal transmission frame including the frequency adjustment information set of the client signal stored in the memory using the frequency adjustment information set of the signal transmission frame stored in the memory, and to control the phase synchronizer to generate the clock based on the frequency adjustment information set of the client signal included in the generated signal transmission frame, in the case in which the receiver receives no signal transmission frame from the network.

6. A transmission method comprising:

receiving a signal transmission frame from a network, the signal transmission frame having a client signal mapped thereto;

separating the client signal from the signal transmission frame;

generating a clock based on a frequency adjustment information set of the client information included in the signal transmission frame;

transmitting the client signal to a client transmission path using the clock generated by the generating;

storing the frequency adjustment information set included in the signal transmission frame in a case in which the receiving receives the signal transmission frame from the network; and switching the generating from a state in which the clock is generated based on the frequency adjustment information set of the client information included in the signal transmission frame received by the receiving, to a state in which the clock is generated based on the frequency adjustment information set stored by the storing, in a case in which the receiving receives no signal transmission frame from the network.

7. The transmission method according to claim 6, wherein the storing sequentially stores a plurality of frequency adjustment information sets in a receiving order, the plurality of frequency adjustment information sets being included in respective signal transmission frames.

8. The transmission method according to claim 7, wherein the switching controls the generating to generate the clock by repeatedly reading the frequency adjustment information sets included in a predetermined time range from amongst the plurality of frequency adjustment information sets stored by the storing.

9. The transmission method according to claim 8, wherein the receiving receives the signal transmission frame from a working line and a backup line of the network, wherein the storing stores the frequency adjustment information set included in the signal transmission frame in a case in which the receiving receives the signal transmission frame from the working line of the network, and wherein in the switching controls the generating to generate the clock based on the frequency adjustment information set stored by the storing and to thereafter generate the clock based on the frequency adjustment information set included in the signal transmission frame received by the receiving from the backup line of the network, in the case in which the receiving receives no signal transmission frame from the working line of the network.

10. The transmission method according to claim 9, further comprising:

mapping the signal transmission frame received from the network to an internal frame of the transmission device, the frequency adjustment information set of the signal transmission frame of the network being added to the internal frame; and separating the client signal from the signal transmission frame separated from the internal frame, wherein the storing sequentially stores the frequency adjustment information sets of the signal transmission frames included in respective internal frames and the frequency adjustment information sets of a plurality of client signals included in respective signal transmission frames in a receiving order, in the case in which the receiving receives the signal transmission frame from the network, and wherein the switching generates the signal transmission frame including the frequency adjustment information set of the client signal stored by the storing using the frequency adjustment information set of the signal transmission frame stored by the storing, and controls the generating to generate the clock based on the frequency adjustment information set of the client signal included in the generated signal transmission frame, in the case in which the receiving receives no signal transmission frame from the network.

* * * * *